United States Patent [11] 3,632,308

| [72] | Inventors | Lawrence C. Klein<br>Hubbell, Mich.;<br>Laurence G. Stevens, Des Plaines, Ill. |
|---|---|---|
| [21] | Appl. No. | 882,809 |
| [22] | Filed | Dec. 5, 1969 |
| [45] | Patented | Jan. 4, 1972 |
| [73] | Assignee | Universal Oil Products Company<br>Des Plaines, Ill. |

[54] RECOVERY OF COPPER VALUES FROM SLAG
3 Claims, No Drawings

[52] U.S. Cl. .................................................. 23/125,
23/117, 75/115
[51] Int. Cl. .................................................. C01g 3/10
[50] Field of Search ................................... 23/125,
117, 143, 200; 75/115

[56] References Cited
UNITED STATES PATENTS

| 1,399,020 | 12/1921 | Lee et al. | 23/125 |
| 1,414,491 | 5/1922 | Welch | 23/125 X |
| 1,544,493 | 6/1925 | Soulie-Cottineau | 75/115 |
| 1,727,073 | 9/1929 | Mayer et al. | 23/125 X |
| 1,944,444 | 1/1934 | Marsh et al. | 23/125 |
| 1,949,927 | 3/1934 | Corson | 23/125 X |
| 2,153,908 | 4/1939 | Bagby | 23/125 |
| 2,424,866 | 7/1947 | Udy | 75/21 |
| 2,850,357 | 9/1958 | Myers et al. | 23/117 |
| 3,273,997 | 9/1966 | Wilson | 75/115 X |
| 3,322,532 | 5/1967 | Wieder | 75/108 |

*Primary Examiner*—Edward Stern
*Attorneys*—James R. Hoatson, Jr. and Bernard L. Kramer

ABSTRACT: Recovery of metal values from slag, produced during the pyrometallurgical processing of metal concentrate or scrap material, by grinding the slag, agitating the ground slag with sulfuric acid in a free oxygen atmosphere at 250°–450π ζ f., and separating a liquid concentrate containing said metal values from a solid precipitate low in said values.

000

RECOVERY OF COPPER VALUES FROM SLAG

BACKGROUND OF THE INVENTION

It is well known to recover metal values from metal concentrates and/or scrap material by pyrometallurgical processing. In normal practice the pyrometallurgical processing is conducted on a mixture of the metal concentrate and scrap material. Following the pyrometallurgical processing, a fraction rich in the metal values is separated from slag, and the fraction rich in metal values is processed in conventional manner to recover the desired metal values. The slag separated from the pyrometallurgical processing is difficult to process and generally is discarded as waste material.

DESCRIPTION OF THE INVENTION

The slag contains metal values and in some cases may contain the metal values in a concentration equal or substantially equal to the metal values contained in the original ore. Accordingly it would be of advantage to recover such metal values from the slag and thereby increase the yield of desirable metal values. The present invention produces a novel method for accomplishing this.

In one embodiment the present invention relates to a method for recovering metal values from slag produced during the pyrometallurgical processing of metallic concentrate or scrap material, which comprises grinding said slag, agitating the ground slag with sulfuric acid in a free oxygen atmosphere at the temperature of from 250° to about 450° F., and separating therefrom a liquid concentrate containing said metal values from a solid precipitate low in said values.

While the present invention may be used for the recovery of metal values as, for example, manganese, nickel, cobalt, etc., is particularly applicable to the recovery of copper, and the following description will be directed primarily to the recovery of copper from copper-containing slags, with the understanding that it also may apply to the recovery of the other metals.

In accordance with the present invention, the slag resulting from the pyrometallurgical processing of metallic concentrate and/or scrap material is first ground, pulverized, crushed or the like into finely divided condition. Preferably the slag is ground to −35 mesh or finer and thus generally will be ground to −35 to ±80 mesh. The mesh size is conventional U.S. Series sieve size.

The ground slag then is reacted with sulfuric acid in the presence of a free oxygen atmosphere, which conveniently comprises air but may be oxygen gas. The air or oxygen gas generally will be charged at an initial pressure of from about 10 to about 200 and preferably from about 30 to about 150 p.s.i.g. The sulfuric acid may be of any suitable concentration and generally will comprise an aqueous solution of from about 3 percent to about 10 percent by weight concentration. It is understood that specific sulfuric acid concentration will be correlated with the particular slag being processed.

In accordance with the present invention the treatment with sulfuric acid under oxygen pressure is effected at a temperature of from about 250° to about 450° F. It is understood that slightly lower or somewhat higher temperatures may be used but generally will not exceed about 500° F. The use of the relatively low temperature in the process of the present invention offers an important advantage over the necessity of utilizing much higher temperatures, which may be of the order of 1,200° F. in order to obtain substantial recovery of metal values from such slags.

When the slag is treated in the manner herein described, it appears that the slag is substantially completely solubilized. This is somewhat surprising because such solubilization of metal concentrates does not appear to occur. Another surprising result is that the precipitate formed from such processing is a new or at least different mixture of components and thus also differs from precipitates formed in the acid treating of metallic concentrates. Still another unusual effect is the fact that, when the treatment is effected in oxygen atmosphere as herein described, aluminum is solubilized while iron is not. This is just the reverse which occurs when acid treatment is effected in the absence of an oxygen atmosphere. The present process also differs from the use of oxidizing agents to oxidize metal sulfides to metal sulfates because the present process is effective even in the substantial absence of sulfur.

The treatment of the present invention is effected in any suitable manner. In one embodiment it is effected in a batch-type operation in which the ground slag and sulfuric acid are charged into a suitable zone which then is sealed and pressured with oxygen. The zone should be equipped with suitable mixing device and means for heating the same to the desired temperature. The treating is continued for a suitable time, which may range from 0.5 to 10 hours or more, preferably 1 to 5 hours. The specific time of reaction will vary with the particular slag being treated. In general the batch-type operation is preferred, although it is understood that a continuous-type operation, in which the slag, acid and oxygen are introduced and withdrawn continuously or continually, may be employed. Regardless of which method is used, it will be found that the slurry withdrawn from the reaction zone contains a light-colored, generally white, precipitate which on exposure to air turns slightly yellowish. The precipitate is substantially free of copper, thus indicating that the copper is completely solubilized and is contained in the filtrate. The filtrate is separated from the precipitate by filtering, centrifuge or in any other suitable manner and then is processed in conventional manner to recover the metal values.

From the above discussion, it will be seen that the present invention provides a novel method for recovering metal values from slags, which slags heretofore have been discarded because of the difficulty of processing in the prior art methods.

The following examples are introduced to further illustrate the novelty and utility of the present invention but not with the intention of unduly limiting the same.

EXAMPLE I

Raw granulated slag, recovered from the pyrometallurgical processing of a copper concentrate, was further ground to pass through 35 mesh and then charged into a stainless steel autoclave together with 6 percent sulfuric acid. The autoclave was pressurized to 50 p.s.i.g. with oxygen, the mixture agitated and heat applied. The autoclave was heated to between 250° and 350° F. Pressure in the autoclave developed to between 75 and 100 p.s.i.g. The time at temperature and pressure was 2 hours. Upon discharging from the autoclave, the slurry contained a white precipitate which upon exposure to air turned slightly yellowish. The precipitate contained no copper. Analysis of the filtrate indicated substantially complete recovery of the copper.

EXAMPLE II

Another run was made in substantially the same manner as described in example I except that no oxygen was used. The slag and acid mixture was heated to 370° F. to obtain a pressure of 100 p.s.i.g. in the autoclave over 2 hours. On discharging from the autoclave, a white precipitate had formed but the precipitate did not discolor upon exposure to air. Some slag remained unreacted. Analysis indicated that only 35.5 percent of the copper was recovered.

A comparison of the results in examples I and II shows a considerable difference in the composition of the precipitate, as well as a considerable difference in the composition of the filtrate. This demonstrates the criticality of effecting the treatment in the presence of oxygen atmosphere.

EXAMPLE III

In this example, a slag having the following analysis was processed in substantially the same manner as described in examples I and II. The analysis (semiquantative) of the slag was as follows:

TABLE I

| Metal | Percent by Weight |
| --- | --- |
| Ca, Si | >10 |
| Al, Fe | 5–25 |
| Ti, Mg, Na | 0.5–5 |
| Cr, Cu, K | 0.1–1 |
| Mn | 0.05–0.5 |
| Sn, Sr, Pb Zn, B, Ba | 0.01–0.1 |
| V, Ni, Zr | 0.005–0.05 |
| Li | 0.01 |

The above slag was treated in 4 different runs, all of which were made in an agitated, heated 3-gallon autoclave, in which a 1 kg. of the slag, ground to −35 to −80 mesh, was charged along with 6 liters of water and, in one set of runs, 200 ml. of concentrated sulfuric acid and, in the other set of runs, with 300 ml. of concentrated sulfuric acid. Two runs were made in an oxygen atmosphere, in which case the autoclave was pressurized to 50 p.s.i.g. of oxygen and then agitated and heated to a temperature of 260° to 325° F. The reactor was held at a temperature of around 300° F.±±10° F. for 2 hours, following which the autoclave was allowed to cool to room temperature. The pressure at reaction temperature was adjusted to about 100 p.s.i.g. with oxygen.

In the two runs in which oxygen was not used the reactor was agitated and heated to a temperature of 330° to 345° F., resulting in pressures of 95 to 115 p.s.i.g. Here again the reactor was held at temperature for about 2 hours, after which the reactor was cooled to room temperature.

The filtrate was separated from the residue in the above runs and the residue was subjected to analysis. The analysis of the residue for each run, expressed as oxides, are reported in the following table:

TABLE II

Residue After Treatment
(Elements Expressed as Oxides)

| Element | With Oxygen | | Without Oxygen | |
| --- | --- | --- | --- | --- |
| | Run No. 1 | Run No. 2 | Run No. 3 | Run No. 4 |
| $SiO_2$ | 38.34 | 34.14 | 32.10 | 36.56 |
| FeO | 20.17 | 21.90 | 2.30 | 1.84 |
| CaO | 9.92 | 6.38 | 9.30 | 11.54 |
| $Al_2O_3$ | Trace | Trace | 18.90 | 15.22 |
| MgO | 6.12 | 3.47 | 2.91 | 2.89 |
| $SO_3$ | 15.50 | 17.58 | 18.81 | 23.39 |

From the data in the above table it will be seen that aluminum was solubilized in runs Nos. 1 and 2 (with oxygen) and that the iron was substantially not solubilized. REferring to runs Nos. 3 and 4 (without oxygen) it will be noted that the reverse is true and that the aluminum was retained in the residue.

The copper was not determined in the solids of all of the above runs. However, one sample of the solid residue which was assayed for copper, a value of 0.04 percent was found. The assay of the feed showed 0.92 percent by weight of copper. The copper thus was solubilized and retained in the filtrate. Accordingly over 95 percent by weight of the copper was recovered in the process effected in accordance with the present invention.

We claim as our invention:

1. A method for recovering copper values from slag produced during the pyrometallurgical processing of metallic concentrate or scrap material, which comprises grinding said slag, agitating the ground slag with sulfuric acid in a free oxygen atmosphere at an initial pressure of about 10 to about 200 p.s.i.g. and a temperature of from about 250° to about 450° F., and separating therefrom a liquid concentrate containing said copper values from a solid precipitate low in said copper values.

2. The method of claim 1, wherein said oxygen pressure is from about 30 to about 150 p.s.i.g.

3. The method of claim 1 wherein said sulfuric acid is an aqueous solution of from about 3 percent to about 10 percent concentration.

* * * * *